United States Patent [19]

Nagata

[11] Patent Number: 4,744,292
[45] Date of Patent: May 17, 1988

[54] DEVICE FOR ROASTING MEATS

[75] Inventor: Toshio Nagata, Tokyo, Japan

[73] Assignee: Token Kogyo Co., Ltd., Tokyo, Japan

[21] Appl. No.: 888,016

[22] Filed: Jul. 22, 1986

[51] Int. Cl.⁴ ............................................. A47J 37/04
[52] U.S. Cl. ........................................ 99/351; 99/377; 99/391; 99/427; 99/449
[58] Field of Search ................ 99/396, 337, 397, 402, 99/446, 421 R, 421 P, 421 H, 427, 443, 444, 343, 347, 340, 443 C, 377, 443 R, 391, 448, 450, 401, 449, 419, 349-351; 126/338, 25 R, 26, 25 A, 9 B, 41 B; 426/523

[56] References Cited

U.S. PATENT DOCUMENTS

| | | | |
|---|---|---|---|
| 2,614,483 | 10/1952 | Scofield | 99/427 |
| 3,802,331 | 4/1974 | Zickefoose | 99/443 R X |
| 3,908,535 | 9/1975 | Gordon | 99/426 |
| 4,005,646 | 2/1977 | Kruper | 99/450 X |
| 4,421,016 | 12/1983 | Sich | 99/402 |
| 4,442,762 | 4/1984 | Beller | 99/340 X |
| 4,442,763 | 4/1984 | Beller | 99/427 |
| 4,562,771 | 1/1986 | Williams | 99/446 X |
| 4,593,613 | 6/1986 | Waltman | 99/449 X |

FOREIGN PATENT DOCUMENTS

| | | | |
|---|---|---|---|
| 2425860 | 12/1975 | Fed. Rep. of Germany | 99/427 |
| 581962 | 9/1958 | Italy | 99/427 |

Primary Examiner—Timothy F. Simone
Attorney, Agent, or Firm—Fleit, Jacobson, Cohn & Price

[57] ABSTRACT

A device for roasting meats having meat holding portion, a casing, a guide lever, a spring body, a roasting portion, and a lever for operation.

In this device, the meat is roasted from both sides in the roasting portion and movement of the meat into and out of the roasting portion is performed by a remote control from outside of the casing. The roasting portion, grills, for roasting and guide rails which guide the grills to the roasting portion are secured in the casing. Further, a heating opening is provided at the upper surface of the casing so as to use the heat in the roasting portion to keep roasted meat warm.

3 Claims, 2 Drawing Sheets

DEVICE FOR ROASTING MEATS

BACKGROUND OF THE INVENTION

This invention relates to a device for roasting meats over an open fire, particularly a device for roasting meats on both surfaces of the meats while grasping with the meat two grill frames at the same time which is done while roasting of the meat in a casing.

Heretofore, when meat, especially chicken is roasted, the chicken is placed on a grill provided over charcoals to roast the chicken while turning the chicken over from time to time. The conventional manner of roasting is performed while observing the roasting condition. Accordingly, since it is obliged to turn the meat by resorting to man power, this is hard work due to summer heat.

This invention is performed to prevent such a problem. The object of this invention is to provide a device for roasting meats wherein the meats are roasted on both surfaces in a roasting portion of a casing without subjecting the heat energy of the roasting portion to a person. This is done by performing the putting in and taking out of the meat from the roasting portion by using an operating lever located outside of the casing.

Further, another object of this invention is to provide a simple device for roatsing meats in the casing which is compact so as to be able to easily move the device.

BRIEF DESCRIPTION OF THE DRAWINGS

A preferred embodiment of the device for meat roasting is shown in the drawings.

DETAILED DESCRIPTION OF THE INVENTION

Figure 1:
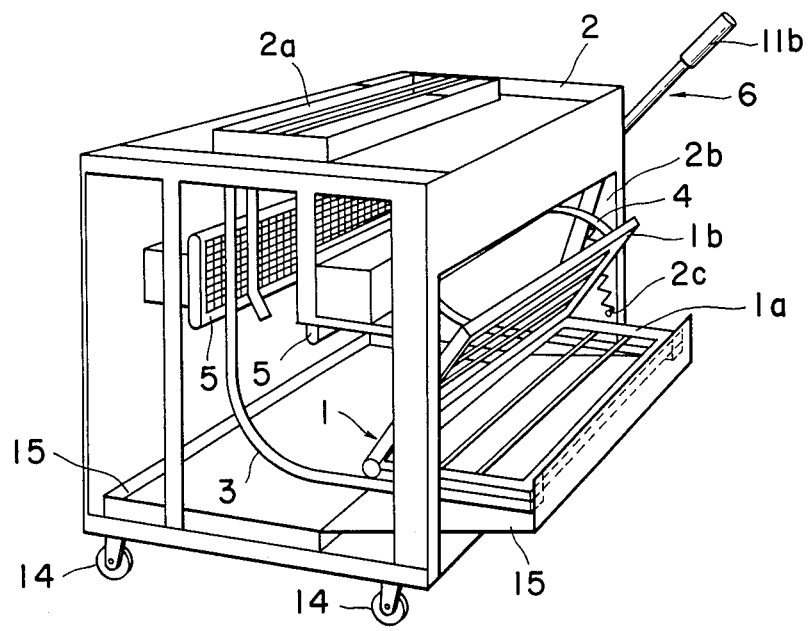
FIG. 1 is a device for meat roasting, which is a perspective view of the device for meat roasting showing the inside by removal of a side plate.

FIG. 1 shows a device for meat roasting the, material portions of the device for meat roasting comprising a meat holding portion 1, a casing 2, a guide rail 3, a spring body 4, a roasting portion 5 and an operation lever 6.

Figure 2:
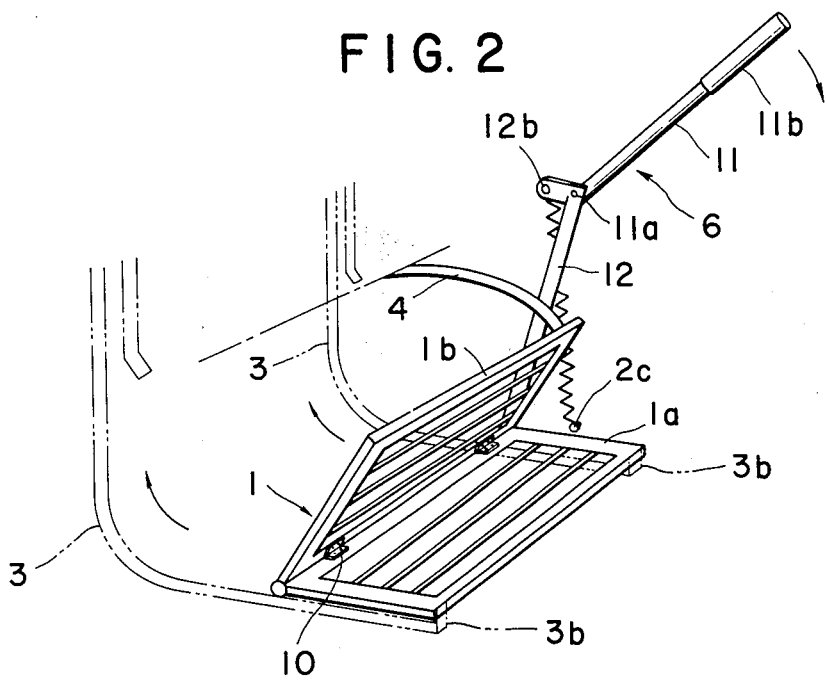
FIG. 2 is a perspective view which shows a a meat holding portion incorporated into the device.

The meat holding portion 1 is two grill frames, as shown in FIG. 2, composed of two grill frames, a receiving board 1a and a pressing board 1b which are respectively composed of a plurality of longitudinally disposed parallel rod members which support the meat thereon, one end portion of the meat holding portion 1 is secured with a hinge 10 and another end portion is adapted to open and close.

A heating opening 2a and an operation opening 2b are located at the upper surface and the side of the casing respectively as shown in FIG. 1. The other surfaces of the casing are closed. The heating opening 2a is used for keeping roasted meats warm, where the grill frames are disposed in tension so as to be able to hold the meats therein. The operation opening 2b is an opening where a roasted meat is removed or a meat to be roasted is fed into the casing.

The guide rails 3 are attached to both sides of the casing 2 and are bent in an L shape so that the meat holding portion 1 may be moved between the heating opening 2a and the operation opening 2b of the casing 2 by the guide rails 3. Further, an end portion 3a of the heating opening 2a of the guide rail 3 is folded in a U shape, and the end portion 3b located at the operation opening 2b is formed in a L shape, whereby both end portions restrict the movement of the meat holding portion 1.

Figure 3:
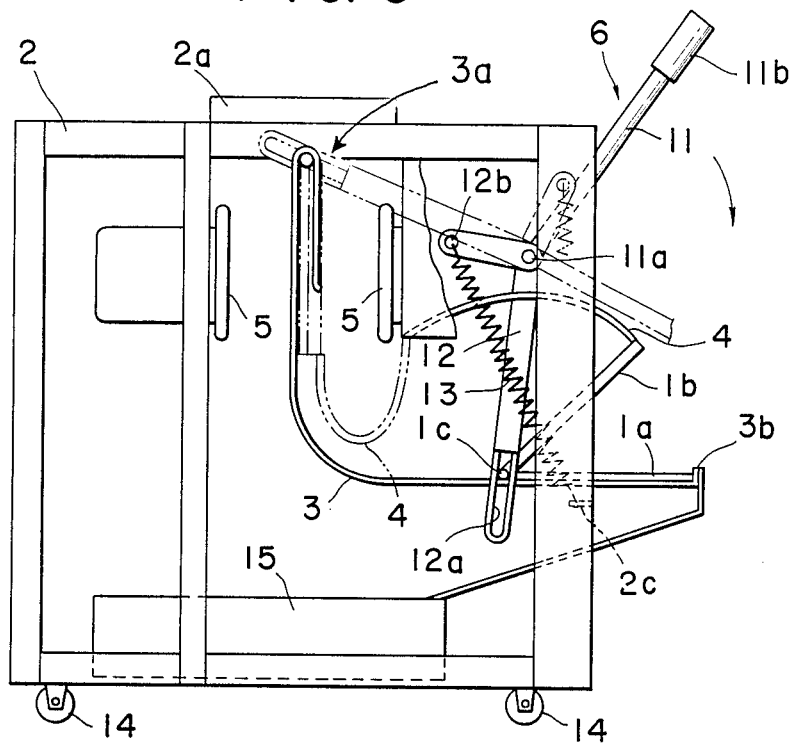
FIG. 3 is a side view which shows a condition wherein a side plate is removed so that the inside of the device for meat roasting may be observed and FIG. 4 is a perspective view of the device for meat roasting.

The spring body 4 is, as shown in FIG. 3, a loosely curved leaf spring secured between a pressing board 1b of the meat holding portion 1 and the casing 2. The spring body 4 urges the meat holding portion 1 in an opening direction when the meat holding portion 1 is positioned at an operation opening 2b, while the spring body 4 urges the meat holding device 1 in a closed direction when it is positioned at a place other than the operation opening, for instance, at the end portion 3a of the guide rails located at the heating opening. In other words, when the meat holding portion 1 is positioned at the operation opening 2b as shown in FIG. 3 (broken line in figure), the spring body 4 is suspended in a curved shape so as to be convex towards the upper portion of the casing to urge the pressing board of the meat holding portion 1 upwards, thereby facilitating the taking out or the taking in of the meat at the meat holding portion 1. On the other hand, when the spring body 4 is positioned at other end 3a of the guide rail 3, the spring body is suspended to form a U shape extending in the lower direction (2 dots-dash-line in figure) to operate to grasp the meat between the pressing board 1b and a receiving board 1a by urging the pressing board 1b in a closed direction. The change of the spring body 4 in a pressurized direction is due to the gradual change of the suspension state of the spring body according to the movement of the meat holding portion 1 as described above. For this reason, the opening and closing of the meat holding portion 1 is carried out automatically by the movement of the meat holding portion without the use of any other opening and closing mechanism. Further, the spring body 4 urges the meat holding portion 1 to engage the guide rail 3 with a proper pressure so that the meat holding portion 1 may be moved smoothly along the guide rail 3.

Further, the roasting portions 5 are, as shown in FIG. 1 and FIG. 3, secured to the casing 2 so as to expose the meat holding portion 1 from front and rear at the position near the heating opening 2a of the casing 2 while maintaining a proper distance. The meat held in the meat holding portion 1 is thereby roasted from both sides simultaneously.

Figure 4:
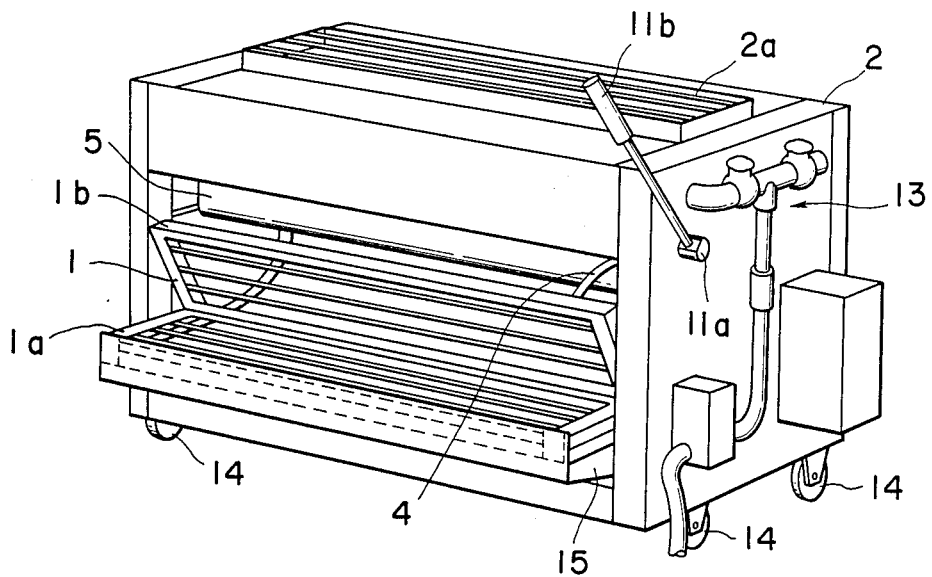

By this, it is not necessary to turn over the meat to observe the roasting condition thereof. Electricity or gas is used as an energy source for the roasting portion 5. The energy source is supplied from an electric source or a gas cannister provided at the outside of the casing 2. Further, the numeral 13 in FIG. 4 is piping for gas interconnected with a gas cannister.

An operating lever 6 is composed of a lever 11 positioned at the outside of the casing 3 and an action lever 12 positioned inside of the casing 2 divided at the intermediate portion thereof. One end of the operating lever 11 is pivotably supported by the casing 2 and at another end thereof a grasping portion 11b is formed. At one end of the action lever 12, a long hole 12a is formed. The long hole 12a is provided with a loosely inserted projection 1c formed at the side of a secured portion of the meat holding portion 1. The fact that the projection 1c is loosely inserted in the action lever 12 is due to the absorption of the change of the moving radius because the movement of the meat holding portion 1 is not carried out by a circular orbit, but by gradually changing its moving radius.

Further, another end of the action lever 12 is fixedly secured to the supported portion 11a of the operation lever 11. When the operation lever 11 is rotated, the action lever 12 is adapted to rotate with a center of the supported portion 11a being integrated with operating lever 11.

Further, in FIG. 2 and FIG. 3, the numeral 13 is a tension spring, which is suspended between an end portion 12b where the supported portion 11a of the other end of the action lever 12 is formed in an L-shape and a latching projection 2c projectively formed to the side of the casing 2. The tension spring 13 is adapted to be positioned across the supporting portion 11a by the rotation of the acting lever 12 as shown in FIG. 3. In other words, the tension spring 13 is positioned at the positions shown by a solid line and a dotted line in FIG. 3. When the tension spring is positioned at the position in the solid line, the meat holding portion 1 is urged so as to engage with the end portion 3b of the rail 3 at the operating opening, while when the meat holding portion is positioned in the dotted line position, the meat holding 1 is urged so as to engage with the end portion 3a at the heating opening. Thus the tension spring 13 has a function to stop the meat holding portion 1 at an appointed position.

In FIG., the numeral 14 illustrates 4 casters disposed at the bottom surface of the casing 2, by which the movement of the meat roaster is facilated. The meat roaster can be easily used for barbecues and the like, especially in the outdoors by the use of the casters 14.

Further, the numeral 15 is an oil tank placed at the lower portion in the casing 2. The oil tank receives dropping oil droplets from the meat holding portion 1 positioned at any position of the guide rail 3. Due to the oil tank 15, the environment in which the meat roaster is used can be maintained without contamination.

The operation of the meat roaster will now be described. First, the roasting portion 5 is lit. In this firing condition, raw meat is placed on the receiving plate 1a of the meat holding portion 1 at the position of the opening operation 2b. The raw meat may be a meat lump or a small lump of split meat. The operation lever 6 is turned in a direction shown by an arrow in FIG. 2 or FIG. 3 against the spring force of the spring 13 by grasping a handle portion 11b of the operation lever 11. By this turning, the meat holding portion 1 moves along the guide rail 3 and the pressing board 1b of the meat holding portion 1 moves gradually to a closed direction by aid of the spring body 4 during the moving process. During the movement of the meat holding portion 1, the pressing board 1b is closed and the raw meat in the meat holding portion 1 is grasped by the receiving board 1a and the pressing board 1b. The turning of the lever 6 is continued and the meat holding portion 1 is engaged with the end portion 3a of the keeping rail 3 at the heating opening to stop further movement of the meat holding portion. The stop at this position is held in plane by the action of the tension spring. The meat holding portion 1 at this position is placed approximately midway between the roasting portions 5, 5. The raw meat in the meat holding portion 1 is roasted from both sides simultaneously. Oil droplets from the meat holding portion 1 during roasting are received by the oil tank. The roasting time is determined by previous experience and the roasting condition of the meat is controlled by time. After passing a controlling time, the operation lever 6 is turned in a reverse direction from the previous turning. The meat holding portion 1 moves along the guide rail 3 in the reverse direction against the previous direction. When the meat holding portion is located near the operating opening 2b, the pressing board 1b moves in an opening direction by the aid of the spring body 4. When the operation lever 6 is continued to be turned, the meat holding portion 1 engages with the end portion 3b of the guide rail 3 at the operation opening 26 in an opened state of the pressing board 1b. This stopping condition is stable because the meat holding portion 1 is urged by the tension spring 13 in the engaging direction. The oil droplets from the meat holding portion 1 may be received by the oil tank 15. The roasted meat in the meat holding portion 1 can be easily taken out because the pressing board 1b is opened.

Further, although this roasting meat may be soon eaten, in case of delayed eating after several hours, the roasted meat may be kept warm by placing the meat on rod members disposed at the heating opening 2a of the casing 2. By the process described above, the step in which the raw meat is cooked to roasted meat is completed. The meat holding portion 1 becomes empty by taking out the roasted meat, and new raw meat may be supplied again, thereby repeating the previous operation.

Further, in case of eating the roasted meat outdoors, this device may be moved outdoors. By this, the roasted meat hot from the device can be eaten outdoors. This movement can be performed easily by the casters 14 secured to the lower portion of the casing 2.

Since this device for roasting meats is composed as described above, the following effects can be abtained.

(1) By roasting meats from both sides at the roasting portion in the casing and taking taking in and out the meats from the roasting portion by a remote control located outside of the the casing through the operating lever, the meats can be roasted directly without exposing a person's body to the roasting portion, whereby comfortable roasting operation can be performed at a high temperature.

(2) Since the roasting portion, the rod members for roasting meat, and the guide rails which guide the rod members to the roasting portion are installed in the casing, the device can be compactly arranged and the movement of the device is also easy.

(3) Since the heating opening includes rods at the upper surface of the casing the heat in the roasting portion may be used as the source for keeping meat warm to provide a special means for keeping meat warm and contribute to energy savings.

What is claimed is:

1. A device for roasting meats comprising:
   a meat holding portion two grill frames, one end of said two grill frames being pivotably secured to each other and another end of said two grill frames being positioned to open and close;
   a casing including a heating opening located at an upper surface and an operation opening located at a side surface for taking in and out of meat from said meat holding portion;
   two guide rails secured to sides of said casing and being bent approximately in an "L" shape for guiding of said meat holding portion between said heating opening and said operation opening;

a spring body secured between said meat holding device and said casing to urge said meat holding portion positioned at said operation opening in an opening direction, and further to urge the meat holding portion in a closed direction by the movement of said meat holding device;

a roasting portion secured to the casing to heat said meat holding portion from front and rear adjacent to said heating opening; and an operating lever secured to said casing and said meat holding portion, a portion of said lever being positioned outside of said casing, whereby said meat holding portion is moved to said roasting portion or withdrawn therefrom by the movement of said lever.

2. A device for roasting meats according to claim 1, wherein said casing is provided with casters for moving said casing.

3. A device for roasting meats according to claim 1, wherein said casing is provided with an oil tank under said casing for receiving oil droplets from said meat holding portion.

* * * * *